(12) United States Patent
Joo et al.

(10) Patent No.: US 10,878,214 B2
(45) Date of Patent: Dec. 29, 2020

(54) COMPLEX BIOMETRIC SENSOR INCLUDING COLOR CONVERSION LAYER

(71) Applicant: ELECTRONICS AND TELECOMMUNICATIONS RESEARCH INSTITUTE, Daejeon (KR)

(72) Inventors: Chul Woong Joo, Sejong-si (KR); Seung Youl Kang, Daejeon (KR); Jaehyun Moon, Daejeon (KR); Seongdeok Ahn, Daejeon (KR); Jae-Eun Pi, Daejeon (KR); Young Sam Park, Daejeon (KR); Byoung-Hwa Kwon, Daejeon (KR); Sung Haeng Cho, Cheongju-si (KR); Jeong Ik Lee, Daejeon (KR); Nam Sung Cho, Daejeon (KR); Su Jae Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/378,484

(22) Filed: Apr. 8, 2019

(65) Prior Publication Data
US 2019/0311177 A1    Oct. 10, 2019

(30) Foreign Application Priority Data

Apr. 9, 2018  (KR) .................. 10-2018-0041217
Oct. 16, 2018  (KR) .................. 10-2018-0123460

(51) Int. Cl.
*G06K 9/00* (2006.01)
*G06F 21/32* (2013.01)
*H04L 29/06* (2006.01)

(52) U.S. Cl.
CPC ......... *G06K 9/00013* (2013.01); *G06F 21/32* (2013.01); *G06K 9/0012* (2013.01);
(Continued)

(58) Field of Classification Search
CPC .... G06K 9/0004; G06K 9/00013; G06K 7/14; G06K 9/2018; G06F 2203/0338;
(Continued)

(56) References Cited

U.S. PATENT DOCUMENTS 6,287,915 B1 * 9/2001 Muramatsu ....... H01L 29/42324
                                                  438/257
2005/0058852 A1 * 3/2005 Tyan ................... H01L 51/5048
                                                  428/690

(Continued)

FOREIGN PATENT DOCUMENTS

| KR | 10-2017-0037436 A | 4/2017 |
| KR | 10-2017-0105272 A | 9/2017 |
| KR | 10-2018-0061165 A | 6/2018 |

*Primary Examiner* — Yuzhen Shen
(74) *Attorney, Agent, or Firm* — Rabin & Berdo, P.C.

(57) ABSTRACT

Provided is a complex biometric sensor. The complex biometric sensor includes a substrate including a light emitting region, a first light receiving region, and a second light receiving region, a light emitting part disposed adjacent to the substrate in the light emitting region, a color conversion layer disposed on the substrate in the light emitting region and vertically overlapping the light emitting part; a first light receiving layer disposed on the substrate in the first light receiving region, and a second light receiving layer disposed on the substrate in the second light receiving region. The light emitting part generates light of a first wavelength. The color conversion layer receives light of the first wavelength and emits the light of the first wavelength and light of the second wavelength. The first light receiving layer detects the light of the first wavelength. The second light receiving layer detects the light of the second wavelength.

16 Claims, 8 Drawing Sheets

(52) U.S. Cl.
CPC ............... *G06K 2009/0006* (2013.01); *G06K 2009/00395* (2013.01); *H04L 63/0861* (2013.01)

(58) Field of Classification Search
CPC ............ H01L 27/3234; H01L 27/3227; A61B 5/02427; A61B 5/02438
See application file for complete search history.

(56) References Cited

U.S. PATENT DOCUMENTS

| | | | |
|---|---|---|---|
| 2011/0306922 A1* | 12/2011 | Khan | C04B 35/6264 604/20 |
| 2012/0105200 A1 | 5/2012 | Yoo et al. | |
| 2015/0270313 A1* | 9/2015 | Popp | H01L 51/5206 315/152 |
| 2015/0364527 A1* | 12/2015 | Wang | H01L 27/1251 257/40 |
| 2016/0373438 A1 | 12/2016 | Yoon | |
| 2017/0112398 A1* | 4/2017 | Narusawa | A61B 5/02416 |
| 2017/0135586 A1* | 5/2017 | Jeon | A61B 5/14532 |
| 2018/0248147 A1* | 8/2018 | Kim | B32B 27/08 |
| 2018/0261655 A1* | 9/2018 | Lee | H01L 27/3269 |
| 2019/0130155 A1* | 5/2019 | Park | G09G 3/3208 |

* cited by examiner

COMPLEX BIOMETRIC SENSOR INCLUDING COLOR CONVERSION LAYER

CROSS-REFERENCE TO RELATED APPLICATIONS

This U.S. non-provisional patent application claims priority under 35 U.S.C. § 119 of Korean Patent Application Nos. 10-2018-0041217, filed on Apr. 9, 2018, and 10-2018-0123460, filed on Oct. 16, 2018, the entire contents of which are hereby incorporated by reference.

BACKGROUND

The present disclosure herein relates to a biometric sensor and, more particularly, to a complex biometric sensor including a color conversion layer.

Fingerprint biometrics technology was first used commercially in a US securities firm in 1968. As the Live-Scan system was developed in the late 1960s, fingerprint recognition may now record fingerprint information electronically. Technology that may convert fingerprint information into a database and automatically identify fingerprint information has been researched and developed based on the Live-Scan system. As the technology is applied to computer communications, the development and application areas of fingerprint recognition technology have been diversified. Based on having unique patterns and features for each individual, the fingerprint recognition technology compares the fingerprint image information to be authenticated with a feature fingerprint registered in advance to determine whether or not the user is a person. This biometric technology is a technology that identifies or authenticates an individual by extracting the physical and behavioral characteristics of a person through an automated device and is called biometric technology or biomatrix.

The vein recognition sensor technology is a biometric recognition technique for extracting a vein pattern of a finger or a vein pattern of a palm of the individual. A technology capable of extracting a specific vein pattern through the change of optical characteristics by hemoglobin in the blood when a near infrared ray is transmitted to a living body has been applied.

SUMMARY

The present disclosure is to provide a complex biometric sensor capable of simultaneously sensing a fingerprint and a vein.

An embodiment of the inventive concept provides a complex biometric sensor including: a substrate including a light emitting region, a first light receiving region, and a second light receiving region; a light emitting part disposed adjacent to the substrate in the light emitting region; a color conversion layer disposed on the substrate in the light emitting region and vertically overlapping the light emitting part; a first light receiving layer disposed on the substrate in the first light receiving region; and a second light receiving layer disposed on the substrate in the second light receiving region, wherein the light emitting part generates light of a first wavelength, wherein the color conversion layer receives light of the first wavelength and emits the light of the first wavelength and light of the second wavelength, wherein the first light receiving layer detects the light of the first wavelength, and wherein the second light receiving layer detects the light of the second wavelength.

In an embodiment, the color conversion layer may include at least one of a quantum dot material, a fluorescent material, and a phosphorescent material.

In an embodiment, the first wavelength may be shorter than the second wavelength, wherein the first light receiving region may be disposed between the second light receiving region and the light emitting region.

In an embodiment, lower surfaces of the color conversion layer, the first light receiving layer, and the second light receiving layers may be at a same level.

In an embodiment, the complex biometric sensor may further include: first source/drain patterns disposed on the substrate and contacting the first light receiving layer; second source/drain patterns disposed on the substrate and contacting the second light receiving layer; and dummy source/drain patterns disposed on the substrate and contacting the color conversion layer.

In an embodiment, the dummy source/drain patterns may be electrically floated.

In an embodiment, the first wavelength may be one of visible light wavelengths, wherein the second wavelength may be a wavelength of near infrared rays or infrared rays.

In an embodiment, the first wavelength may be ranging from about 400 nm to about 500 nm, wherein the second wavelength may be ranging from about 600 nm to about 1000 nm.

In an embodiment, the complex biometric sensor may further include a recess region formed on a lower part of the substrate or on an upper part of the substrate in the light emitting region, wherein the light emitting part may be located within the recess region.

In an embodiment, the complex biometric sensor may further include: an insulating film interposed between the color conversion layer and the substrate, between the first light receiving layer and the substrate, and between the second light receiving layer and the substrate; a first light blocking pattern disposed in the insulating film between the light emitting region and the first light receiving region; and a second light blocking pattern disposed in the insulating film between the first light receiving region and the second light receiving region.

In an embodiment, the first light blocking pattern may extend into the substrate and may be adjacent to a side surface of the light emitting part.

In an embodiment, the light emitting part may include a hole injecting layer, a hole transporting layer, a light emitting layer, an electron transporting layer, and an electron injecting layer, which are sequentially stacked.

In an embodiment, the first light receiving layer and the second light receiving layer may include a first conductive organic layer and a second conductive organic layer, respectively, which constitute a PN junction.

In an embodiment, the first light receiving region may surround the light emitting region, wherein the second light receiving region may surround the first light receiving region.

In an embodiment, a first width parallel to a first direction of the color conversion layer may be greater than a second width parallel to the first direction of the first light receiving layer.

In an embodiment of the inventive concept, a complex biometric sensor includes: a substrate including a light emitting region, a first light receiving region, and a second light receiving region, which are arranged parallel along a first direction; a light emitting part disposed adjacent to the substrate in the light emitting region; a color conversion layer disposed on the substrate in the light emitting region and vertically overlapping the light emitting part; a first light receiving layer disposed on the substrate in the first light receiving region; and a second light receiving layer disposed on the substrate in the second light receiving region, wherein the light emitting part generates light of a first wavelength, wherein the color conversion layer receives the light of the first wavelength and emits the light of the first wavelength and light of a second wavelength toward a living body, wherein the first light receiving layer detects the light of the first wavelength reflected from a surface of the living body, and wherein the second light receiving layer detects the light of the second wavelength reflected from a vein of the living body.

In an embodiment, the first wavelength may be shorter than the second wavelength, wherein the first light receiving region may be disposed between the second light receiving region and the light emitting region.

In an embodiment, the complex biometric sensor may further include: first source/drain patterns disposed on the substrate and contacting the first light receiving layer; second source/drain patterns disposed on the substrate and contacting the second light receiving layer; and dummy source/drain patterns disposed on the substrate and contacting the color conversion layer.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Purposes, other purposes, features, and advantages of the inventive concept will be easily understood through preferred embodiments relating to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

It will also be understood that when a layer (or film) is referred to as being 'on' another layer or substrate, it may be directly on the other layer or substrate, or intervening layers may also be present. Additionally, in the drawings, the thicknesses of components are exaggerated for effective description.

Additionally, embodiments described in this specification will be described with plan views and/or sectional views, that is, ideal exemplary views of the inventive concept. In the drawings, the thicknesses of a layer and an area are exaggerated for effective description. Accordingly, shapes of the exemplary views may be modified according to manufacturing techniques and/or allowable errors. Therefore, the embodiments of the inventive concept are not limited to the specific shape illustrated in the exemplary views, but may include other shapes that may be created according to manufacturing processes. For example, an etched region illustrated as a rectangle may have rounded or curved features. Therefore, areas exemplified in the drawings have general properties, and are used to illustrate a specific shape of a device region. Thus, this should not be construed as limited to the scope of the inventive concept. It will be understood that the terms "first" and "second" are used herein to describe various components but these components should not be limited by these terms. These terms are just used to distinguish a component from another component. Embodiments described herein include complementary embodiments thereof.

The terms used in this specification are used only for explaining specific embodiments while not limiting the inventive concept. The terms of a singular form may include plural forms unless referred to the contrary. The meaning of "comprises," and/or "comprising" in this specification specifies the mentioned component but does not exclude at least one another component.

Hereinafter, embodiments of the inventive concept are described in more detail with reference to the accompanying drawings.

Figure 1:
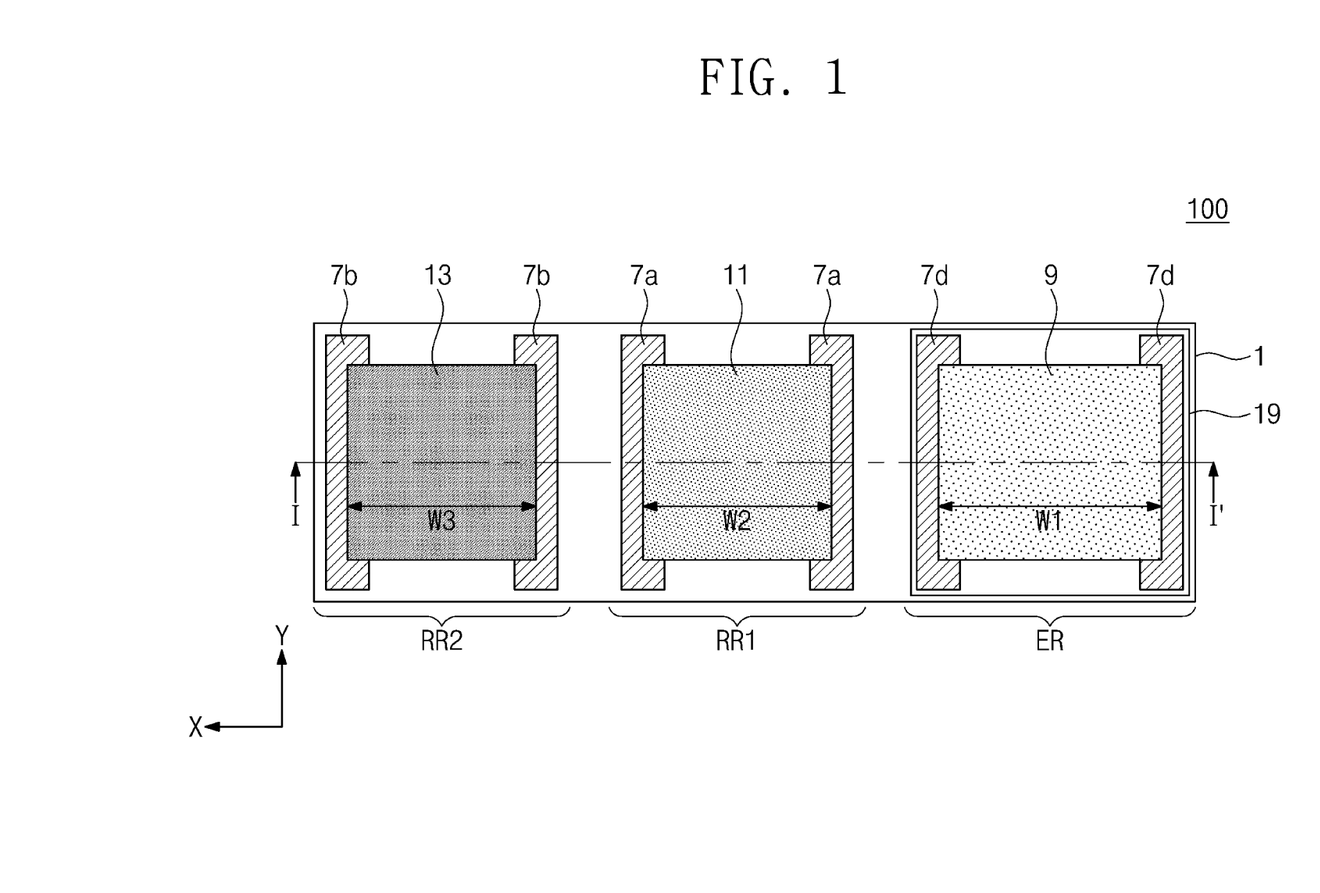
FIG. 1 is a plan view of a complex biometric sensor according to embodiments of the inventive concept.
Figure 2:
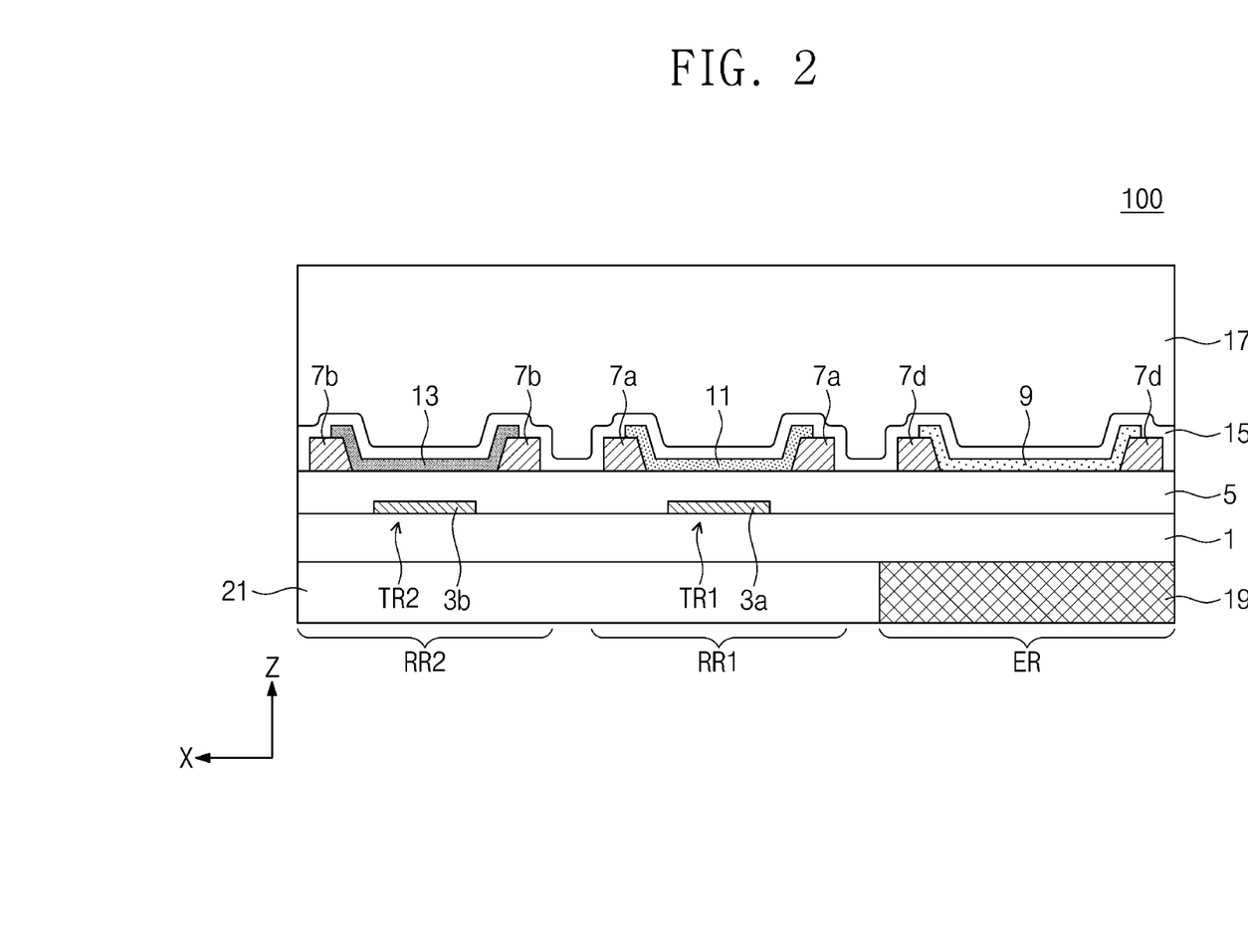
FIG. 2 is a cross-sectional view of the complex biometric sensor of FIG. 1 taken along line I-I' according to embodiments of the inventive concept.

FIG. 1 is a plan view of a complex biometric sensor according to embodiments of the inventive concept. FIG. 2 is a cross-sectional view of the complex biometric sensor of FIG. 1 taken along line I-I' according to embodiments of the inventive concept.

Referring to FIGS. 1 and 2, a complex biometric sensor 100 according to embodiments of the inventive concept includes a substrate 1. The substrate 1 may include a light emitting region ER, a first light receiving region RR1, and a second light receiving region RR2 arranged along a first direction X.

The first light receiving region RR1 may be disposed between the second light receiving region RR2 and the light emitting region ER. The substrate 1 may include at least one of glass, polyimide and polyethylene naphthalene (PEN).

A first gate electrode 3a and a second gate electrode 3b may be disposed on the substrate 1 in the first light receiving region RR1 and the second light receiving region RR2, respectively. The first gate electrode 3a and the second gate electrode 3b may be formed of a metal or a conductive material.

The upper surface of the substrate 1, the first gate electrode 3a, and the second gate electrode 3b may be covered with a first insulating film 5. The first insulating film 5 may be formed by printing, drying, and then heat-treating the solution including a precursor of silicon oxide ($SiO_2$) such as polysilazane, polysiloxane, tetraethyl orthosilicate, and the like, a precursor of aluminum oxide ($Al_2O_3$) such as trimethylaluminium, or a precursor of a good insulating oxide such as zirconium oxide ($ZrO_2$) or titanium oxide ($TiO_2$).

First source/drain patterns 7a spaced apart from each other may be disposed on the first insulating film 5 in the first light receiving region RR1. Second source/drain patterns 7b spaced apart from each other may be disposed on the first insulating film 5 in the second light receiving region RR2. Dummy source/drain patterns 7d spaced apart from each other may be disposed on the first insulating film 5 in the light emitting region ER. A voltage may not be applied to the dummy source/drain patterns 7d. The dummy source/drain patterns 7d may be electrically floated. The first source/drain patterns 7a, the second source/drain patterns 7b, and the dummy source/drain patterns 7d may be formed of metal or a conductive material.

A color conversion layer 9 may be disposed between the dummy source/drain patterns 7d. The color conversion layer 9 may be in contact with the first insulating film 5 and the dummy source/drain patterns 7d at the same time. The color conversion layer 9 may include at least one of a quantum dot material, a fluorescent material, and a phosphorescent material. In the color conversion layer 9, a color conversion phenomenon may occur through energy transfer using Photo Luminescence (PL) characteristics. When adjusting the content/composition of the materials constituting the color conversion layer 9 and/or adjusting the thickness of the color conversion layer 9, the wavelength conversion efficiency of the light transmitted through the color conversion layer 9 may be controlled. Thereby, with a predetermined thickness or content/composition, the color conversion layer 9 receives light of the first wavelength λ1 and emits light of the first wavelength λ1 and light of the second wavelength simultaneously.

The first light receiving layer 11 may be disposed between the first source/drain patterns 7a. The first light receiving layer 11 may be in contact with the first insulating film 5 and the dummy source/drain patterns 7a at the same time. The first gate electrode 3a, the first source/drain patterns 7a, and the first light receiving layer 11 may constitute a first phototransistor TR1.

A second light receiving layer 13 may be disposed between the second source/drain patterns 7b. The second light receiving layer 13 may be in contact with the first insulating film 5 and the dummy source/drain patterns 7b at the same time. The second gate electrode 3b, the second source/drain patterns 7b, and the second light receiving layer 13 may constitute a second phototransistor TR2.

The first light receiving layer 11 and the second light receiving layer 13 absorb light to generate charges such as holes and electrons. The first light receiving layer 11 and the second light receiving layer 13 may be formed of, for example, copper phthalocyanine or pentacene.

A first width W1 of the color conversion layer 9 parallel to the first direction X is greater than a second width W2 parallel to the first direction X of the first light receiving layer 11. The first width W1 of the color conversion layer 9 parallel to the first direction X is greater than a third width W3 parallel to the first direction X of the second light receiving layer 13. The second width W2 may be substantially equal to the third width W3.

The color conversion layer 9, the first light receiving layer 11 and the second light receiving layer 13 may be covered with a second insulating film 15. The second insulating film 15 may be in contact with the dummy source/drain patterns 7d, the first source/drain patterns 7a and the second source/drain patterns 7b, and the first insulating film 5 exposed therebetween at the same time. The second insulating film 15 may be formed of the same or similar material as the first insulating film 5.

The second insulating film 15 may be covered with a first protective film 17. In the light emitting region ER, a light emitting part 19 may be attached to the lower surface of the substrate 1. The light emitting part 19 may be, for example, an organic light emitting diode. In the first light receiving region RR1 and the second light receiving region RR2, the lower surface of the substrate 1 may be covered with a second protective film 21. The first protective film 17 and the second protective film 21 may be formed of the same or similar material as the first insulating film 5.

The complex biometric sensor 100 may simultaneously recognize fingerprints and veins.

Figure 3:
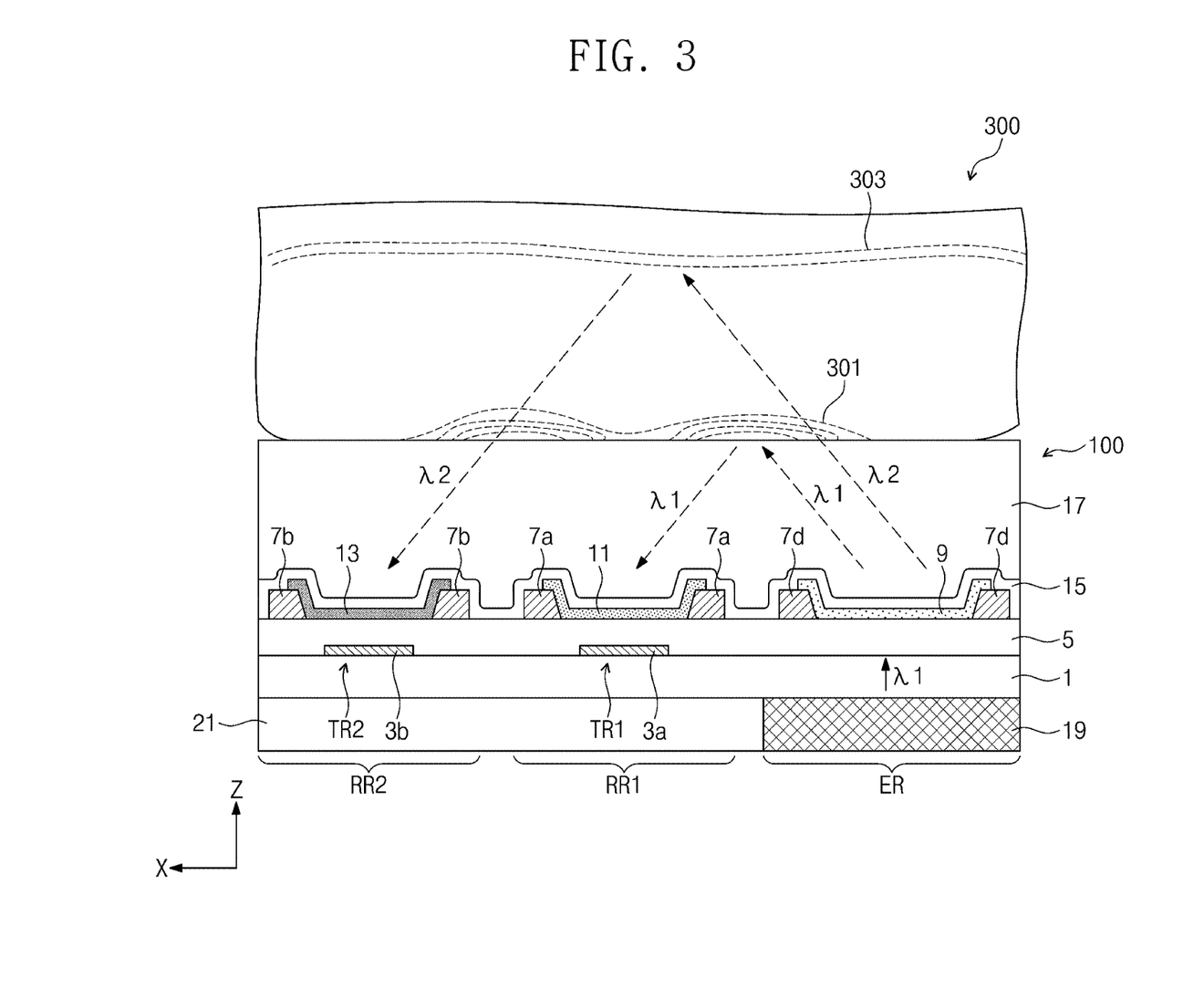
FIG. 3 is a view illustrating an operation of a complex biometric sensor according to an embodiment of the inventive concept.

FIG. 3 is a view illustrating an operation of a complex biometric sensor according to an embodiment of the inventive concept.

Referring to FIG. 3, the light emitting part 19 may emit a first light of a first wavelength λ1. The color conversion layer 9 receives the first light of the first wavelength λ1 and emits the first light of the first wavelength λ1 and a second light of the second wavelength simultaneously. The first wavelength λ1 may be shorter than the second wavelength λ2. As a specific example, the first wavelength λ1 may be any one of visible light wavelengths. The second wavelength λ2 may be a near infrared ray or an infrared ray wavelength. The first wavelength λ1 may be ranging from about 400 nm to about 500 nm. The second wavelength λ2 may be ranging from about 600 nm to about 1000 nm. The first light of the first wavelength λ1 may be reflected at the surface of the skin due to a short wavelength characteristic and may be incident on the first light receiving layer 11. Thus, charges may be generated in the first light receiving layer 11. Thus, the first phototransistor TR1 may recognize the fingerprint 301 of the finger 300, for example.

The second light of the second wavelength λ2 may penetrate the skin to reach the blood vessels in the skin (for example, the vein 303) due to the characteristic of the long wavelength, and the second light of the second wavelength lambda 2 reflected therefrom may be incident on the second light receiving layer 13. Thus, charges may be generated in the second light receiving layer 13. Thus, the second phototransistor TR2 may recognize the vein 303 of the finger 300, for example.

In this way, the complex biometric sensor 100 according to the inventive concept may simultaneously detect the fingerprint 301 and the vein 303.

Figure 4:
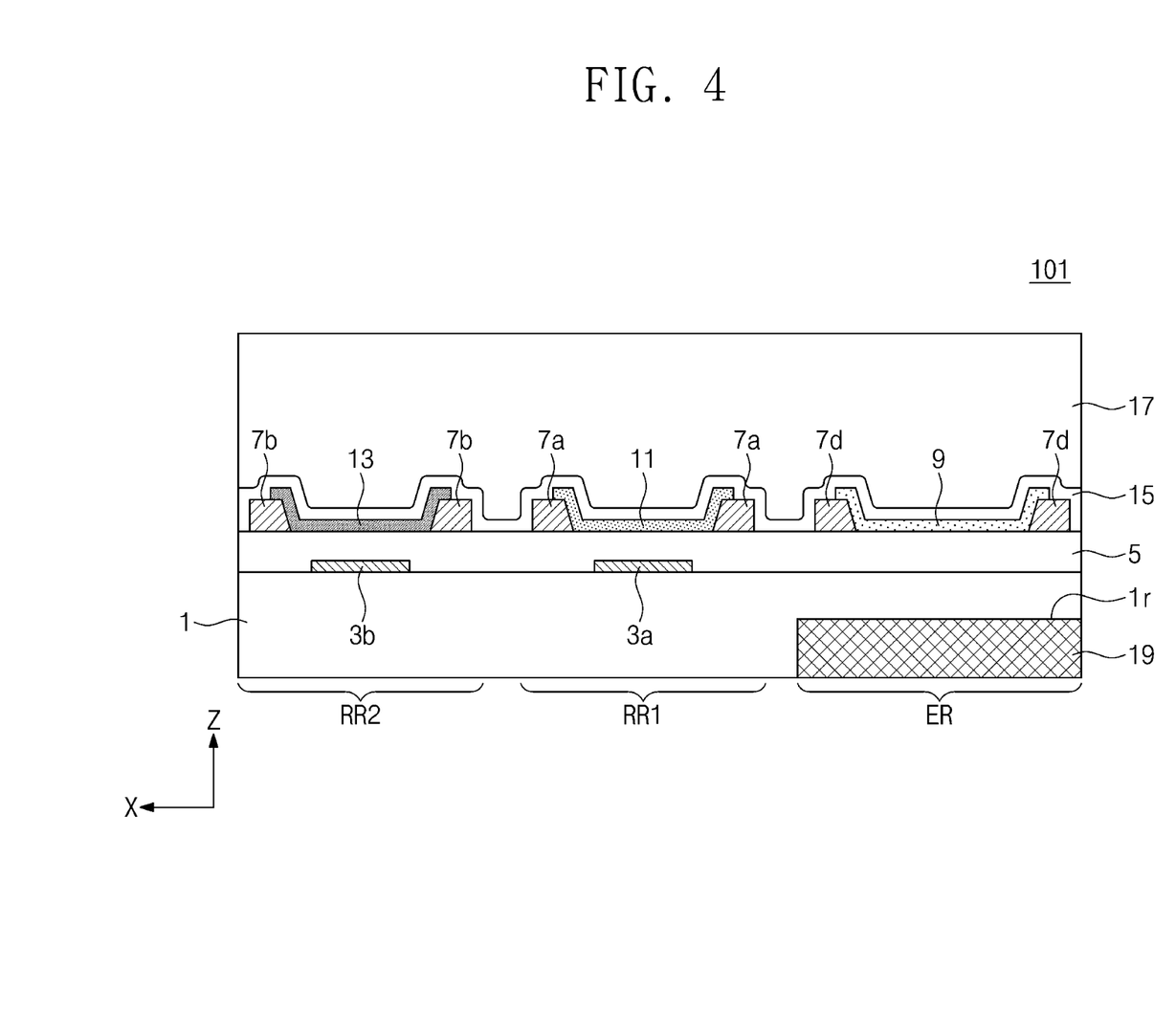
FIG. 4 is a cross-sectional view of a complex biometric sensor according to embodiments of the inventive concept.

FIG. 4 is a cross-sectional view of a complex biometric sensor according to embodiments of the inventive concept.

Referring to FIG. 4, the complex biometric sensor 101 according to the present example does not include the second protective film 21. Instead, the recess region 1r may be disposed on the lower part of the substrate 1 in the light emitting region ER and the light emitting part 19 may be located in the recessed region 1r. Other structures and operation processes may be the same as or similar to those described with reference to FIGS. 1 to 3.

Figure 5:
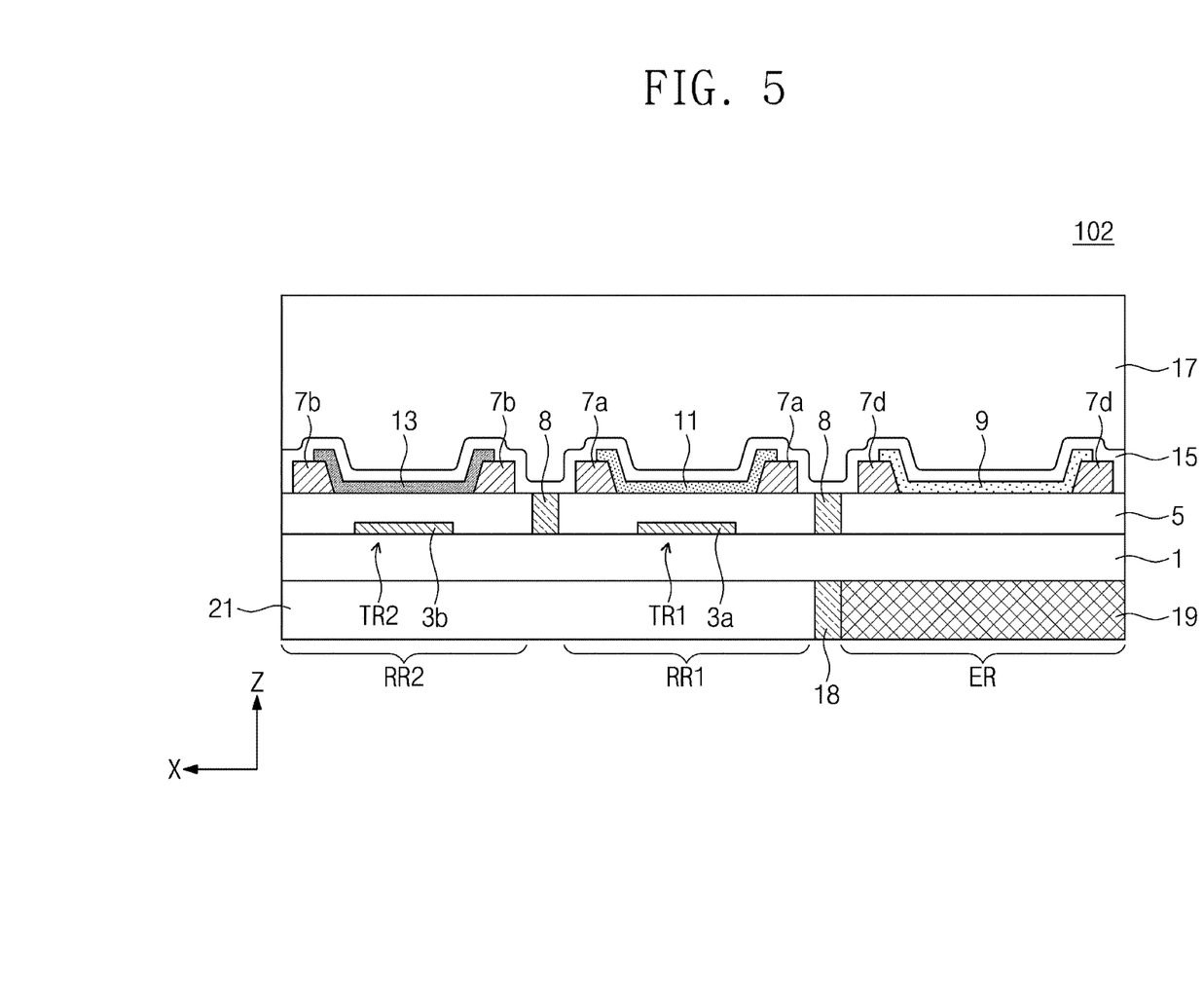
FIG. 5 is a cross-sectional view of a complex biometric sensor according to embodiments of the inventive concept.

FIG. 5 is a cross-sectional view of a complex biometric sensor according to embodiments of the inventive concept.

Referring to FIG. 5, the complex biometric sensor 102 according to the inventive concept may further include a first light blocking pattern 8 disposed in the first insulating film 5. The first light blocking pattern 8 is disposed between the light emitting region ER and the first light receiving region RR1 and between the first light receiving region RR1 and the second light receiving region RR2. In addition, the complex biometric sensor 102 may further include a second light blocking pattern 18 disposed between the light emitting part 19 and the second protective film 21. The first light blocking pattern 8 and the second light blocking pattern 18 may be formed of a metal that may not transmit light or a resin material containing a black pigment. The first light blocking pattern 8 may prevent light generated from the light emitting part 19 from being incident on the first light receiving layer 11 and the second light receiving layer 13 through the first insulating film 5. The second light blocking pattern 18 may prevent light generated from the light emitting part 19 from being incident on the first light receiving layer 11 and the second light receiving layer 13 through the second protective film 21. The first light blocking pattern 8 and the second light blocking pattern 18 prevent interference of unwanted light so that only a desired image may be detected.

Figure 6:
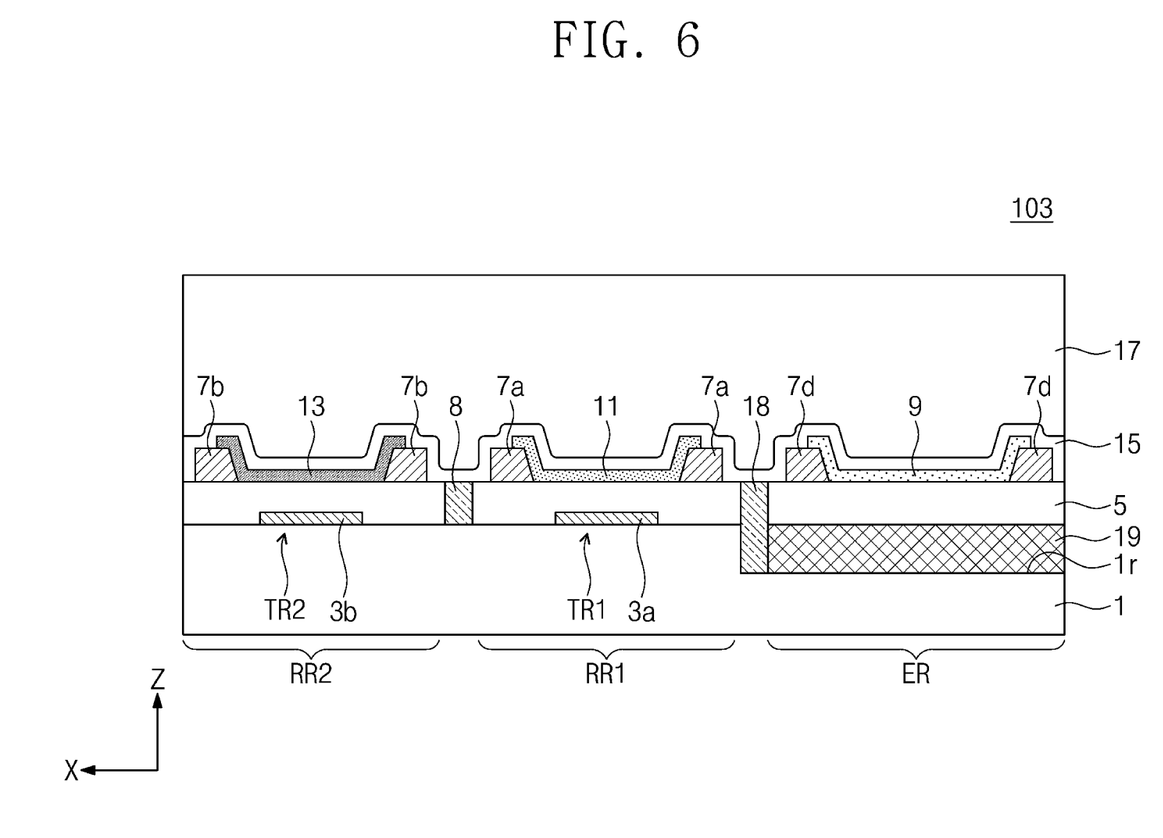
FIG. 6 is a cross-sectional view of a complex biometric sensor according to embodiments of the inventive concept.

FIG. 6 is a cross-sectional view of a complex biometric sensor according to embodiments of the inventive concept.

Referring to FIG. 6, in relation to the complex biometric sensor 103 according to this example, a portion of the upper part of the substrate 1 in the light emitting region ER may be recessed to form the recess region 1r. A light emitting part 19 may be disposed in the recess region 1r. A first light blocking pattern 8 may be disposed in the first insulating film 5 between the first light receiving region RR1 and the second light receiving region RR2. A second light blocking pattern 18 may be disposed in the first insulating film 5 between the first light receiving region RR1 and the light emitting region ER. The second light blocking pattern 18 may be interposed between the side wall of the recess region 1r and the light emitting part 19. That is, the second light blocking pattern 18 may be interposed between the substrate 1 and the light emitting part 19. The lower surface of the first light blocking pattern 8 may be higher than the lower surface of the second light blocking pattern 18. The first light blocking pattern 8 and the second light blocking pattern 18 may prevent light generated from the light emitting part 19 from being incident on the first light receiving layer 11 and the second light receiving layer 13 through the substrate 1 and the first insulating film 5.

Figure 7:
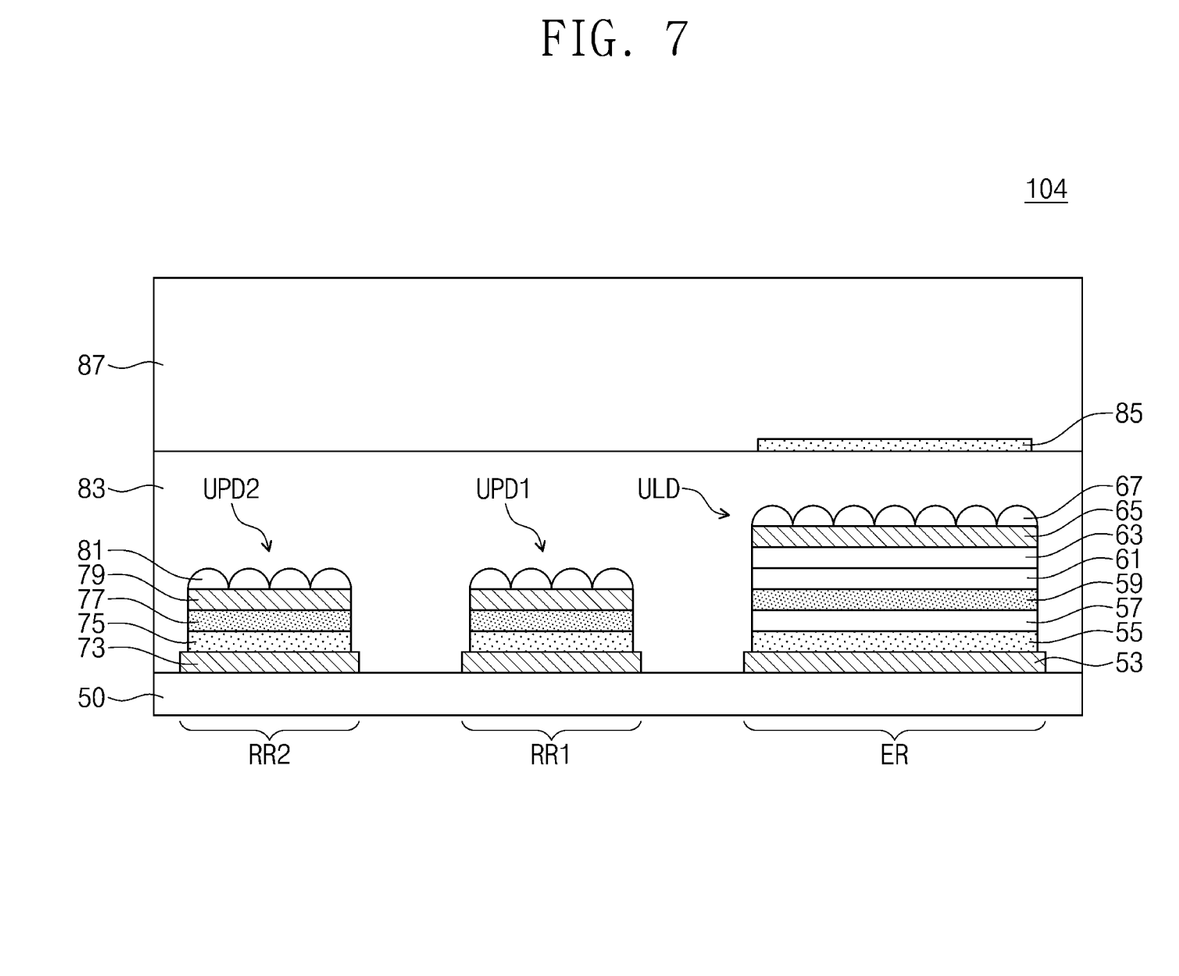
FIG. 7 is a cross-sectional view of a complex biometric sensor according to embodiments of the inventive concept.

FIG. 7 is a cross-sectional view of a complex biometric sensor according to embodiments of the inventive concept.

Referring to FIG. 7, a complex biometric sensor 104 according to this example includes a substrate 50. The substrate 50 may include a light emitting region ER, a first light receiving region RR1, and a second light receiving region RR2. The first light receiving region RR1 may be disposed between the second light receiving region RR2 and the light emitting region ER. The substrate 50 may include at least one of glass, polyimide and polyethylene naphthalene (PEN).

Subsequently, a unit light emitting element ULD may be disposed in the light emitting region ER of the substrate 50. The unit light emitting element ULD may be referred to as an organic light emitting diode. The first unit light receiving element UPD1 may be disposed in the first light receiving region RR1 of the substrate 50. A second unit light receiving element UPD2 may be disposed in the second light receiving region RR2 of the substrate 50.

The unit light emitting element ULD includes a first electrode 53, a hole injecting layer 55, a hole transporting layer 57, a light emitting layer 59, an electron transporting layer 61, an electron injecting layer 63, and a second electrode 65, which are sequentially stacked. As another example, an electron injecting layer, an electron transporting layer, a light emitting layer, a hole transporting layer, and a hole injecting layer may be sequentially provided between the first electrode 53 and the second electrode 65. For simplification of description, although it is described that the unit light emitting element ULD includes the first electrode 53, the hole injecting layer 55, the hole transporting layer 57, the light emitting layer 59, the electron transporting layer 61, the electron injecting layer 63, and the second electrode 65, the inventive concept is not limited thereto.

The light emitting layer 59 may be referred to as an organic light emitting layer. The first electrode 53, the hole injecting layer 55, the hole transporting layer 57, the light emitting layer 59, the electron transporting layer 61, the electron injecting layer 63, and the second electrode 65 may all be formed of a flexible material.

The first electrode 53 and the second electrode 65 may be formed of a thin film of a metal such as aluminum or copper, or a conductive oxide thin film such as indium tin oxide (ITO) or indium zinc oxide (IZO), or an organic material such as PEDOT:PSS. Especially, the second electrode 65 may include a structure in which a metal thin film and a conductive oxide thin film are alternately stacked. In this case, the metal thin film may have a thickness of 5 nm to 15 nm.

The hole injecting layer 55, for example, may be formed N,N'-diphenyl-N,N'-bis-[4-(phenyl-m-tolyl-amino)-phenyl]-biphenyl-4,4'-diamine:DNTPD, phthalocyanine compounds such as copper phthalocyanine, m-MTDATA [4,4', 4"-tris (3-methylphenylphenylamino)triphenylamine], N,N'-di(1-naphthyl)-N,N'-diphenylbenzidine, TDATA, 2-TNATA, Pani/DBSA (Polyaniline/Dodecylbenzenesulfonic acid, PEDOT/PSS(Poly(3,4-ethylenedioxythiophene)/Poly(4-styrenesulfonate), Pani/CSA (Polyaniline/Camphor sulfonicacid, or PANI/PSS(Polyaniline)/Poly(4-styrenesulfonate).

The hole transporting layer 57, for example, may be formed of carbazole derivatives such as N-phenylcarbazole and polyvinylcarbazole, N,N'-bis (3-methylphenyl)-N,N'-diphenyl-[1,1-biphenyl]-4,4'-diamine (TPD), TCTA(4,4',4"-tris(N-carbazolyl)triphenylamine), and NPB(N,N'-di(1-naphthyl)-N,N'-diphenylbenzidine).

The light emitting layer 59 may be formed of any one of PPV(poly(p-phenylenevinylene)), PPP(poly(p-phenylene)), PT (polythiophene), PF(polyfluorene), PFO(poly(9.9-dioctylfluorene), and PVK (poly(9-vinylcarbazole)) and a polymeric material that is a derivative, or a low molecular material including a metal complex such as Alq3 (Tris(8-hydroxyquinolinato)aluminium) that is an Al complex compound series, Ir(ppy)3(fac-tris(2-phenylpyridinato) iridium (III)) that is an Ir complex compound series, or PtOEP(2,3, 7,8,12,13,17,18-octaethyl-12H, 23H-porphyrine platinum (II)) that is a Pt complex compound series. Also, a material in which a low-molecular phosphorescent material is added to PVK(poly(9-vinylcarbazole)) that is a polymer is possible.

The electron transporting layer 61 may be formed of a quinoline derivative.

The electron injecting layer 63 may be formed of LiF, NaCl, CsF, $Li_2O$, BaO, or the like.

Each of the first and second unit light receiving elements UPD1 and UPD2 includes a third electrode 73, a first conductive organic layer 75, a second conductive organic layer 77, and a fourth electrode 79, which are sequentially stacked. The third electrode 73, the first conductive organic layer 75, the second conductive organic layer 77, and the fourth electrode 79 may all be formed of a flexible material. The first conductive organic layer 75 and the second conductive organic layer 77 may constitute the first light receiving layer 11 and/or the second light receiving layer 13 of FIG. 2.

The third electrode 73 and the fourth electrode 79 may be formed of a thin film of a metal such as aluminum or copper, or a conductive oxide thin film such as indium tin oxide (ITO) or indium zinc oxide (IZO), or an organic material such as PEDOT:PSS.

The first conductive organic layer 75 and the second conductive organic layer 77 may constitute a PN junction. That is, the first conductive organic layer 75 and the second conductive organic layer 77 may constitute a photodiode. Alternatively, the photodiode may include the first conductive organic layer 75 and the second conductive organic layer 77. The first conductive organic layer 75 and the second conductive organic layer 77 may be formed of a conductive organic compound and may have a pi conjugation. Any one of the first conductive organic layer 75 and the second conductive organic layer 77 may include a conductive organic compound having a low solid state ionization potential. The other one of the first conductive organic layer 75 and the second conductive organic layer 77 may include a conductive organic compound having a high electron drift mobility, and may have an energy level for electron injection from the third electrode 73 or the fourth electrode 79.

The conductive organic compound having the low solid state ionization potential may be at least one of m-MTDATA (4,4',4"-Tris[phenyl(m-tolyl)amino]triphenylamine), TDAB (1,3,5-tris(diphenylamino)benzene), TDATA (4,4',4"-tris(diphenylamino)-triphenylamine), TDAPB (1,3,5-tris[4-(diphenylamino)phenyl]benzene), DPH (4-diphenylaminobenzaldehyde diphenylhydrazone), CuPc(Copper(II) phthalocyanine), PEDOT:PSS (poly(3,4-ethylenedioxythiophene) polystyrene sulfonate), and a conductive polymer.

The conductive organic compound having a high electron drift mobility may include at least one of Tris(8-quinolinolato)aluminum, boron-containing complex, Oxadiazole-containing Oligo(arylene), Oligo(arylenevinylene) based materials, compounds having benzene or triazine core, compounds having 1,3,5-Triphenylbenzene or 2,4,6-Triphenyltriazine core, and Triarylborane and Silole derivatives.

The unit light emitting element ULD may further include a first organic curved body 67 disposed on the second electrode 65. The plurality of first organic curved bodies 67 may be arranged in an array. The diameter of one first organic curved body 67 may be between 50 nm and 1 μm. The unit light receiving element UPD may further include a second organic curved body 81 disposed on the fourth electrode 79. The plurality of second organic curved bodies 81 may be arranged in an array. The diameter of one second organic curved body 81 may be between 50 nm and 1 μm. The first and second organic curved bodies 67 and 81 may include benzene, naphthalene, phenanthrene, biphenyl, quinoline, fluorine, phenylpyrazole, phenanthroline, quinodimethane, quinoxaline, indolocarbazole, Carbazole, spirobifluorene, pyridine, thiophene, dibenzothiophene, furan, diazafluoren, benzofuropyridine, triazine, anthracene,), pyrene, benzothiazolel, coumarine, quinacridone, phenylpyridine, oxadiazole, phenoxazine, or derivatives thereof. Specifically, the first and second organic curved bodies 67 and 81 may include at least one of NPB {N,N'-Di(1-naphthyl)-N,N'-diphenyl-(1,1'-biphenyl)-4,4'-diamine}, Alq3 {Tris-(8-hydroxyquinoline) aluminum}, and derivatives thereof. Each of the first and second organic curved bodies 67 and 81 may have a width and a height of 50 nm or more and less than 1 μm.

The unit light emitting element ULD may be a top emission organic light emitting diode. The unit light receiving element UPD may be an organic photodiode. The first and second conductive organic layers 75 and 77 constituting the PN junction included in the unit light receiving element UPD may have flexibility because they contain an organic compound. Since the unit light emitting element ULD, the unit light receiving element UPD, and the substrate may be formed of a flexible material, the organic electronic device 100 may have flexibility.

Although not shown in the drawing, transistors for driving the unit light emitting element ULD, the first unit light receiving element UPD1, and the second unit light receiving element UPD2 may be further disposed.

The unit light emitting element ULD, the first unit light receiving element UPD1, and the second unit light receiving element UPD2 may be covered with an insulating film 83. A protective film 87 may be disposed on the insulating film 83. A color conversion layer 85 may be interposed between the insulating film 83 and the protective film 87 in the light emitting region ER.

The operation of the complex biometric sensor 104 may be the same as that described with reference to FIG. 3. That is, the unit light emitting element ULD may emit light of the first wavelength λ1. The color conversion layer 85 receives the light of the first wavelength λ1 and emits light of the first wavelength λ1 and light of the second wavelength simultaneously. The first wavelength λ1 may be shorter than the second wavelength λ2. The light of the first wavelength λ1 may be reflected at the surface of the skin due to a short wavelength characteristic and may be incident on the first unit light receiving element UPD1. The light of the second wavelength λ2 may be penetrated to the blood vessels in the skin (for example, the vein 303) due to the characteristic of the long wavelength, and may be reflected from the vein 303, and may be incident on the second unit light receiving element UPD2.

Figure 8:
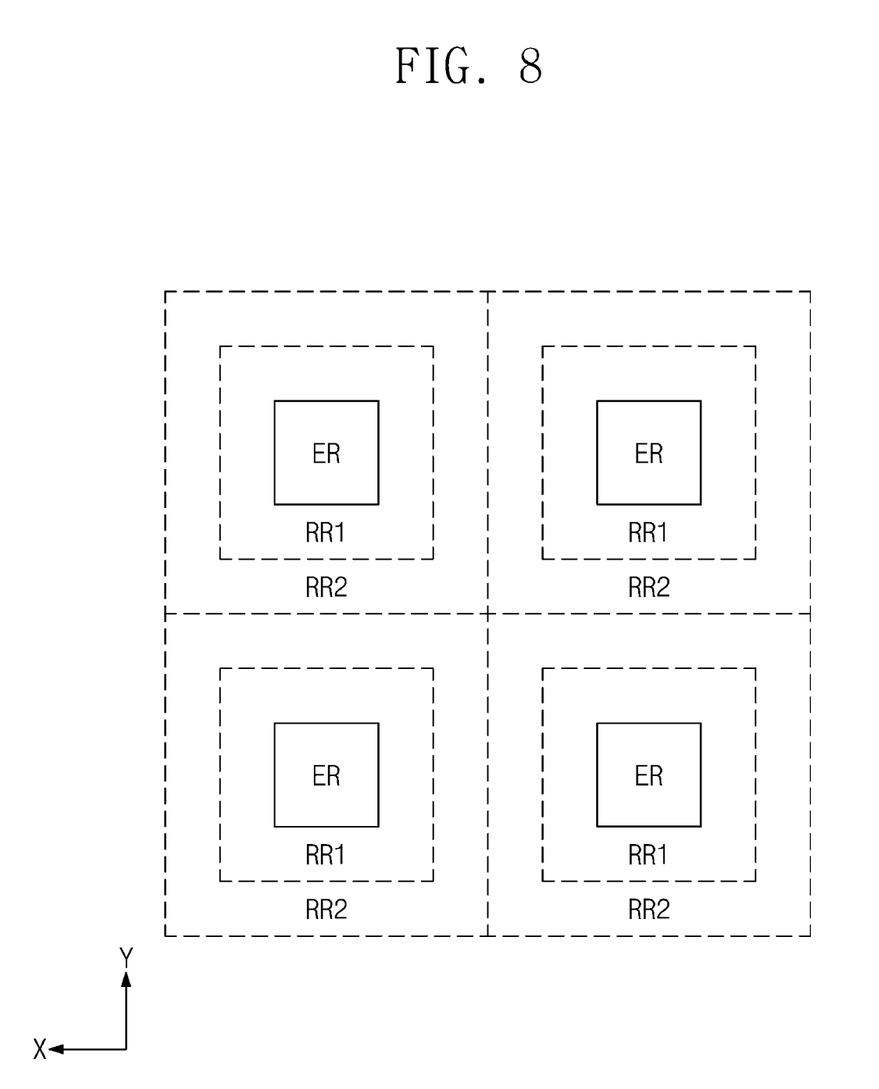
FIG. 8 is a plan view showing a layout relationship between a light emitting region, a first light receiving region, and a second light receiving region in complex biometric sensors according to embodiments of the inventive concept.

FIG. 8 is a plan view showing a layout relationship between a light emitting region, a first light receiving region, and a second light receiving region in complex biometric sensors according to embodiments of the inventive concept.

Referring to FIG. 8, the light emitting regions ER may be spaced apart from each other. The first light receiving regions RR1 may be arranged to surround the respective light emitting regions ER1. The second light receiving regions RR2 may be arranged to surround the respective first light receiving regions RR1. A plurality of first phototransistors TR1 or a plurality of first unit light receiving elements UPD1 may be disposed in the first light receiving regions RR1. A plurality of second phototransistors TR2 or a plurality of first unit light receiving elements UPD2 may be disposed in the second light receiving regions RR2.

According to embodiments of the inventive concept, a highly integrated complex biometric sensor capable of simultaneously sensing a fingerprint and a vein may be provided.

Although the exemplary embodiments of the inventive concept have been described, it is understood that the inventive concept should not be limited to these exemplary embodiments but various changes and modifications may be made by one ordinary skilled in the art within the spirit and scope of the inventive concept as hereinafter claimed.

What is claimed is:

1. A complex biometric sensor comprising:
a substrate including a light emitting region, a first light receiving region, and a second light receiving region;

a light emitting part disposed adjacent to the substrate in the light emitting region;
a color conversion layer disposed on the substrate in the light emitting region and vertically overlapping the light emitting part;
a first light receiving layer disposed on the substrate in the first light receiving region;
a second light receiving layer disposed on the substrate in the second light receiving region;
first source/drain patterns disposed on the substrate and contacting the first light receiving layer;
second source/drain patterns disposed on the substrate and contacting the second light receiving layer; and
dummy source/drain patterns disposed on the substrate and contacting the color conversion layer,
wherein the light emitting part generates a first light of a first wavelength,
wherein the color conversion layer receives the first light of the first wavelength and emits the first light of the first wavelength and a second light of a second wavelength,
wherein the first light receiving layer detects the first light of the first wavelength, and
wherein the second light receiving layer detects the second light of the second wavelength.

2. The complex biometric sensor of claim 1, wherein the color conversion layer comprises at least one of a quantum dot material, a fluorescent material, or a phosphorescent material.

3. The complex biometric sensor of claim 1, wherein the first wavelength is shorter than the second wavelength, and
wherein the first light receiving region is disposed between the second light receiving region and the light emitting region.

4. The complex biometric sensor of claim 1, wherein lower surfaces of the color conversion layer, the first light receiving layer, and the second light receiving layers are disposed at a same level.

5. The complex biometric sensor of claim 1, wherein the dummy source/drain patterns are electrically floated.

6. The complex biometric sensor of claim 1, wherein the first wavelength is one of visible light wavelengths, and
wherein the second wavelength is a wavelength of near infrared rays or infrared rays.

7. The complex biometric sensor of claim 1, wherein the first wavelength ranges from about 400 nm to about 500 nm, and
wherein the second wavelength ranges from about 600 nm to about 1000 nm.

8. The complex biometric sensor of claim 1, further comprising a recess region formed on a lower part of the substrate or on an upper part of the substrate in the light emitting region,
wherein the light emitting part is located within the recess region.

9. The complex biometric sensor of claim 1, further comprising:
an insulating film interposed between the color conversion layer and the substrate, between the first light receiving layer and the substrate, and between the second light receiving layer and the substrate;
a first light blocking pattern disposed in the insulating film between the light emitting region and the first light receiving region; and
a second light blocking pattern disposed in the insulating film between the first light receiving region and the second light receiving region.

10. The complex biometric sensor of claim 9, wherein the first light blocking pattern extends into the substrate and is adjacent to a side surface of the light emitting part.

11. The complex biometric sensor of claim 1, wherein the light emitting part comprises a hole injecting layer, a hole transporting layer, a light emitting layer, an electron transporting layer, and an electron injecting layer, which are sequentially stacked.

12. The complex biometric sensor of claim 1, wherein the first light receiving layer and the second light receiving layer comprise a first conductive organic layer and a second conductive organic layer, respectively, which constitute a PN junction.

13. The complex biometric sensor of claim 1, wherein the first light receiving region surrounds the light emitting region, and
wherein the second light receiving region surrounds the first light receiving region.

14. The complex biometric sensor of claim 1, wherein a first width parallel to a first direction of the color conversion layer is greater than a second width parallel to the first direction of the first light receiving layer.

15. A complex biometric sensor comprising:
a substrate including a light emitting region, a first light receiving region, and a second light receiving region, which are arranged parallel along a first direction;
a light emitting part disposed adjacent to the substrate in the light emitting region;
a color conversion layer disposed on the substrate in the light emitting region and vertically overlapping the light emitting part;
a first light receiving layer disposed on the substrate in the first light receiving region;
a second light receiving layer disposed on the substrate in the second light receiving region;
first source/drain patterns disposed on the substrate and contacting the first light receiving layer;
second source/drain patterns disposed on the substrate and contacting the second light receiving layer; and
dummy source/drain patterns disposed on the substrate and contacting the color conversion layer,
wherein the light emitting part generates a first light of a first wavelength,
wherein the color conversion layer receives the first light of the first wavelength and emits the first light of the first wavelength and a second light of a second wavelength toward a living body,
wherein the first light receiving layer detects the first light of the first wavelength reflected from a surface of the living body, and
wherein the second light receiving layer detects the second light of the second wavelength reflected from a vein of the living body.

16. The complex biometric sensor of claim 15, wherein the first wavelength is shorter than the second wavelength, and
wherein the first light receiving region is disposed between the second light receiving region and the light emitting region.

* * * * *